(No Model.) 2 Sheets—Sheet 1.
G. A. & C. F. FLEMING & G. T. McLAUGHLIN.
FRUIT PITTING AND SPREADING MACHINE.
No. 424,771. Patented Apr. 1, 1890.
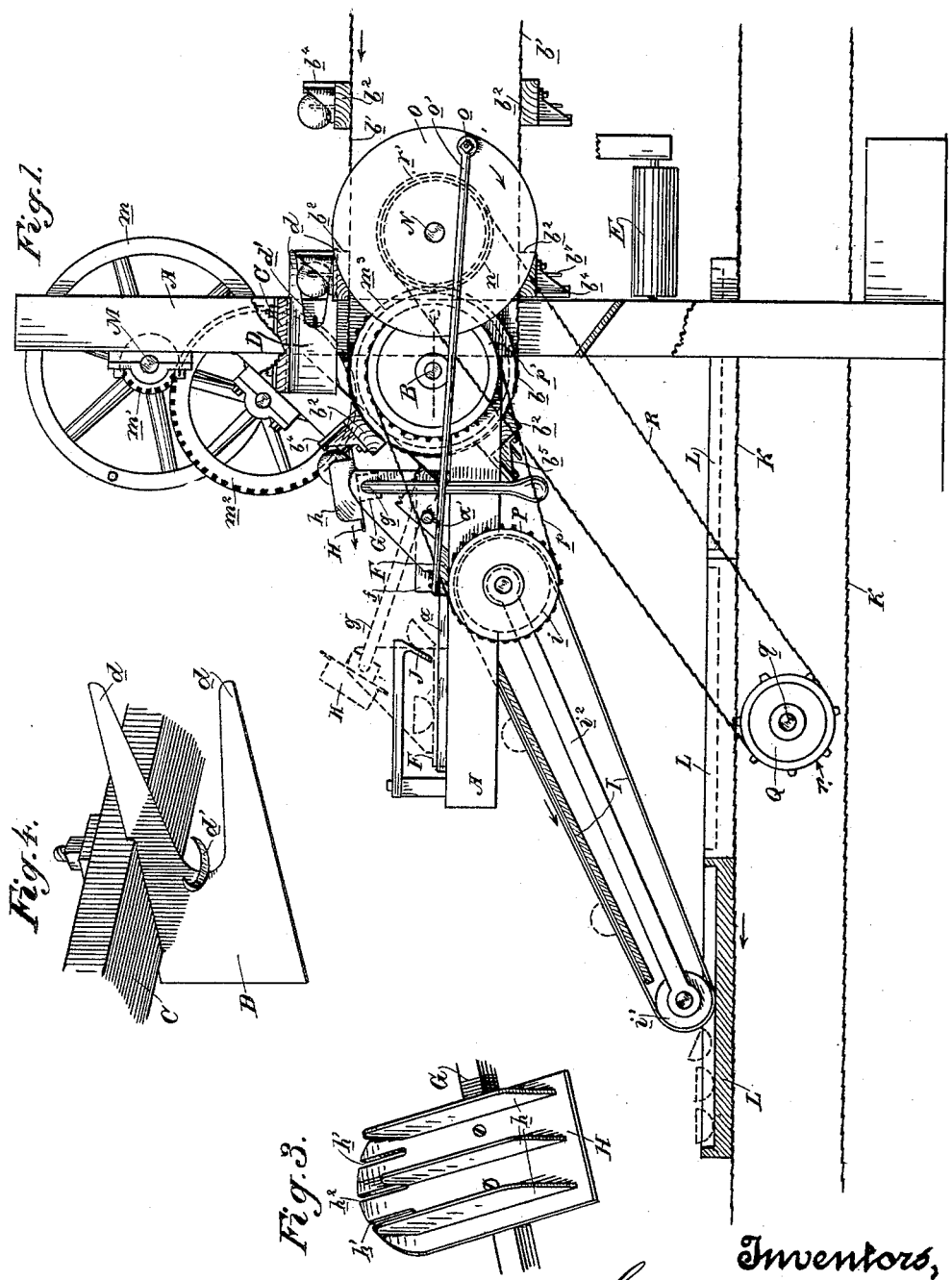
Witnesses,
Inventors,
George A. Fleming
Charles F. Fleming
George T. McLaughlin
By Dewey & Co.

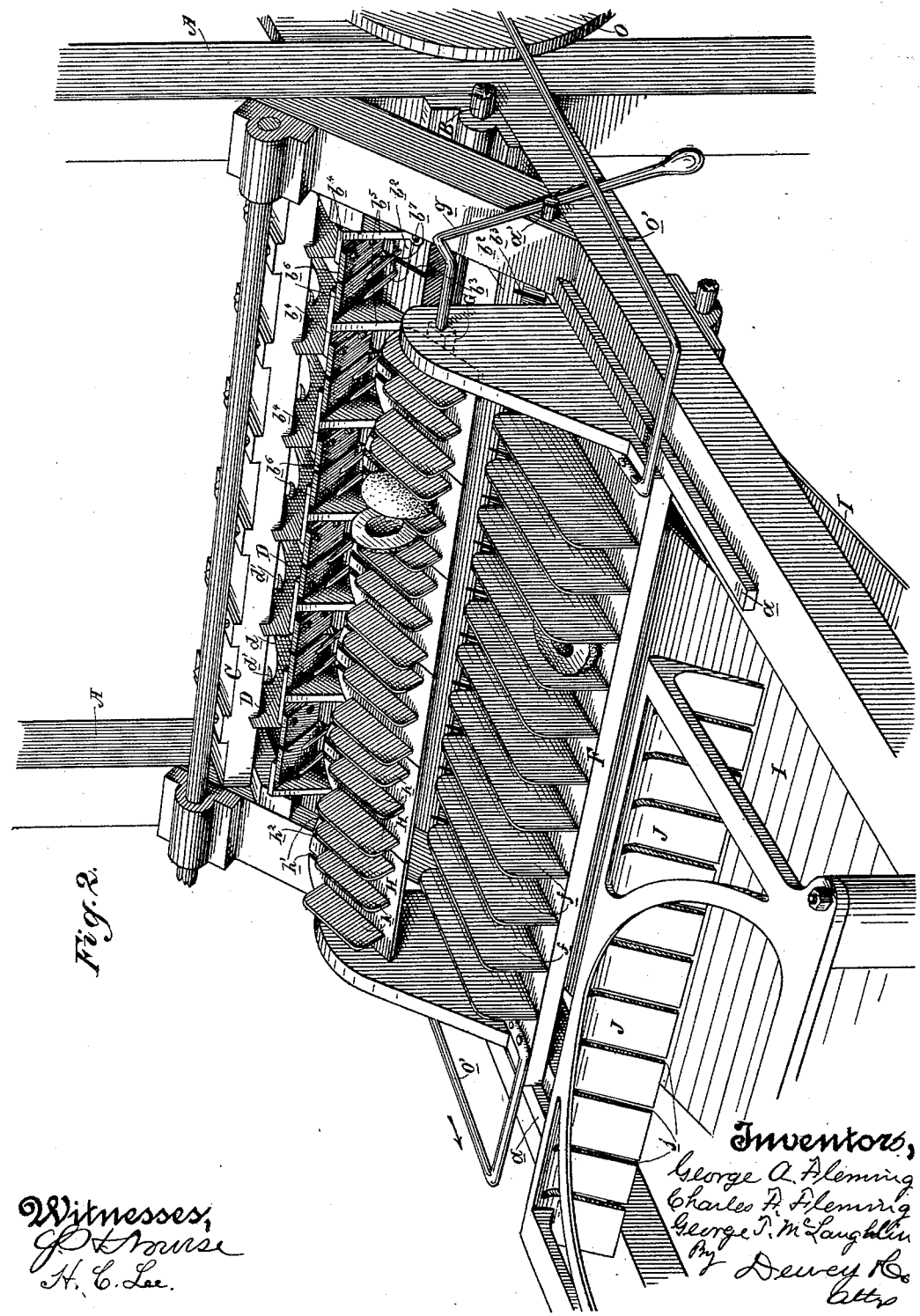

UNITED STATES PATENT OFFICE.

GEORGE A. FLEMING, CHARLES F. FLEMING, AND GEORGE T. McLAUGHLIN OF SAN JOSÉ, CALIFORNIA.

FRUIT PITTING AND SPREADING MACHINE.

SPECIFICATION forming part of Letters Patent No. 424,771, dated April 1, 1890.

Application filed October 21, 1889. Serial No. 327,671. (No model.)

*To all whom it may concern:*

Be it known that we, GEORGE A. FLEMING, CHARLES F. FLEMING, and GEORGE T. MC-LAUGHLIN, citizens of the United States, residing at San José, Santa Clara county, State of California, have invented an Improvement in Fruit Pitting and Spreading Machines; and we hereby declare the following to be a full, clear, and exact description of the same.

Our invention relates to the class of fruit-handling machines, and especially to that class adapted for the pitting or stoning of the fruit and delivering and spreading it out in suitable trays; and our invention consists in the novel constructions, arrangements, and combinations hereinafter fully described, and specifically pointed out in the claims.

The object of our invention is to provide a machine of this class of great capacity, effective and rapid in its operation, adapted to accurately cut the fruit into halves, remove and discharge the stones, and deliver the fruit perfectly and distribute it evenly over receiving-trays.

Referring to the accompanying drawings for a more complete explanation of our invention, Figure 1 is a side elevation of our machine, a part of the frame being broken away. Fig. 2 is a perspective view of the rear of the machine. Fig. 3 is a perspective view of one of the receiving-chutes H. Fig. 4 is a view of one of the knives D.

A is the frame of the machine. B is a shaft mounted transversely upon said frame and carrying at each end a sprocket-pulley $b$, over which passes the bights of endless chains $b'$, provided with cross-slats $b^2$, said chains and slats forming an endless carrier, the other bight of which is mounted upon suitable sprocket-pulleys, unnecessary herein to show. The cross-slats $b^2$ are provided with a series of transverse grooves or slots $b^3$ dividing the slat into a number of sections, and on the edge of each section is secured a flange $b^4$, supported by a brace $b^5$, said flanges having a length shorter than that of the sections and having secured to their inner or adjacent ends the strips $b^6$, made of rubber or other suitable flexible or springy material, the ends of said strips approaching but separated from each other in the plane of and by the width, approximately, of the slots $b^3$ of the slats $b^2$. Holding-prongs $b^7$ are secured to and rise from the slat-sections on each side of their slots.

C is a cross support or beam mounted transversely of the frame and having secured to its under side the series of vertical knives D. These knives consist of thin metal sheets, and they are curved or forked out at their forward ends, as shown at $d$, forming two forwardly-projecting prongs one above the other, and at the base of each cut-out portion are formed or secured the small holding-points $d'$, which are located in horizontal planes and at right angles to the knife, projecting to each side sufficiently to enable them to perfectly engage and hold the pit, said points being curved suitably, as shown.

The knives D are located perfectly in line with the series of slots $b^3$ of the slats $b^2$, so that as the carrier advances the slats pass on each side of the knives.

The operation of the parts, as far as explained, is as follows: The fruit is impaled upon the prongs $b^7$ of the slats, two prongs entering a single fruit, so that it lies centrally over the slot $b^3$ of the slat and rests against the flexible bearing-pieces $b^6$. As the carrier advances, the fruit is brought into contact with the curved knives D, which cut it in halves, the pit itself being caught by the cross-points $d'$ and held so that as the carrier advances the cut fruit passes by on each side of the knife, being held to place not only by the prongs on which it is impaled, but also by the flexible bearing-strips $b^6$, which yield sufficiently to prevent bruising, but at the same time prevent the halves of the fruit from remaining on the knives or being forced off of the slats, while allowing the detention of the pit. The released pits drop down through the carrier and are received upon a cross-belt E, below which is made to travel by any suitable means, thereby discharging the pits to one side.

Mounted and adapted to slide in suitable guides $a$ on each side of the frame is a reciprocating table F, provided with vertical partitions $f$, dividing it into compartments adapted to receive the cut fruit, one-half going in each division. At the upper inner end of this sliding or reciprocating table is mounted a rock-shaft G, to the top of which are firmly secured the receiving-chutes H. These chutes consist of plates having vertical flanges $h$, one in the longitudinal center of the plate and one on each side thereof, thus dividing each chute into two separate compartments. The chute at its forward end has a slit $h'$ extending backwardly into each compartment and a central slit $h^2$ extending backwardly to the forward end of the central flange. There are as many of these chutes as there are knives D, and they are located along the rock-shaft G in such positions that the central flange of each is in direct line with a knife D, whereby, when the table F is moved toward the knives, the chutes pass their central slits $h^2$ on each side of the knives, so as to come in close quarters therewith.

The operation again taken up is as follows: As the traveling carrier passes a slat beyond the knives carrying the divided fruit with it, the reciprocating table F has been moved toward the knives, so that the chutes H are each in position at the ends of the knives and close thereto, overlapping the bight of the carrier and so located that as the carrier moves down for its return the prongs $b^7$ pass down through the side slits $h'$ of the receiving-chutes and leave the divided fruit in said chutes, one-half in each compartment of each chute. Then the table moves away from the carrier, and by suitable mechanism, presently to be described, the shaft G is rocked so as to tilt the chutes H, whereby their fruit is discharged upon the divided table F, one half of the fruit going into one compartment and the other half into the other compartment of said table.

I is an endless traveling receiving-apron located under the reciprocating table, said apron being mounted at one end on a roller $i$ and at the other end on a roller $i'$, the lower roller being supported by a frame $i^2$, extending from the shaft of the upper roller and having a movement thereon, so that said apron I swings from above, its lower end being free to rise above the flanges of the trays which pass under it, as will be presently described. At the extreme end of frame A is supported a scraper-plate J, which occupies a transverse position across and over the apron I, said scraper-plate having vertical slots $j$ made in it in line with the partitions $f$ of the reciprocating table and adapted to allow said partitions to pass through them.

The operation again is as follows: As the table F with its cut fruit moves toward the scraper J and passes under it, its partitions passing through the slots $j$, the cut fruit is scraped off backwardly from the table and drops upon the apron I.

K is an endless carrier for the trays, said carrier being mounted under the machine and traveling in a horizontal plane over suitable end pulleys. The trays L are simply placed upon the carrier K and move successively under the lower end of the apron I, the flanges of said trays passing under the end of the apron-frame, which rises over each flange and drops down into the next tray. The cut fruit is thereby carried downwardly by the apron I and deposited successively upon the traveling trays.

The movements of the various parts are accomplished as follows: M is the main drive-shaft mounted in the upper portion of the frame and having on one end the crank-wheel $m$, said shaft also carrying a pinion $m'$, which meshes with a gear $m^2$, and this gear meshes with the gear $m^3$ on the end of the shaft B, which carries the sprocket-pulleys $b$, over which the endless chains $b'$ of the main or primary carrier passes, thereby driving said carrier. N is a counter-shaft, having on one end a gear $n$, which meshes with the gear $m^3$ of the shaft B, and said shaft N carries on each end a crank-wheel O, having a wrist-pin $o$, from which extend the pitman-rods $o'$, one on each side, and having their forward ends connected with the reciprocating table F. Secured to the end of the rock-shaft G is a crank-arm $g$, which bends over the side of the frame and passes down on one side thereof, as shown, and in the side of the frame A is mounted a fixed pin or stud $a'$, which lies directly in the path of the crank-arm $g$. The lower end of the crank-arm $g$ is weighted, so as to return it to normal position and hold its chutes H in position to receive the fruit. Now, when the table F moves away from the knives, carrying the rock-shaft with it, the crank-arm $g$ of said shaft comes in contact with the fixed stud or pin $a'$ and is thereby arrested, so that under the continued movement of the table and shaft said shaft is rocked to effect the discharge of the fruit from its chutes into the divisions of the table, as heretofore described.

The swinging apron I is driven by means of a sprocket-pulley P on the end of its upper roller $i$, said sprocket-pulley receiving an endless chain $p$, which passes its other end over a sprocket-pulley $p'$ on the end of the shaft B.

The tray-carrier K is operated by means of a toothed wheel Q on a shaft $q$ below it, the tooth of said wheel engaging at proper intervals with the chains of the carrier, and said wheel is driven by means of an endless chain R, which passes one end over a sprocket-pulley $r$ on the end of the shaft $q$ and its other end over a sprocket-pulley $r'$ on one end of the counter-shaft N.

The general operation of the machine is as follows: The fruit is placed upon the cross-slats $b^2$ of the main carrier, being impaled upon the prongs $b^7$, and said carrier being advanced by the mechanism described the fruit is carried directly against and is cut in half by the fixed knives D, the pit being retained—held by the cross-points d' of the knives—while the cut fruit passes on by the knives. As the carrier bends around its pulleys on its return course, the cut fruit is delivered directly into the chutes H, which are at that time up close behind the knives and overlapping the bight of the carrier, one half of the fruit passing into one compartment of the chute and the other half into its other compartment. Then the table F moving away, the chutes are tilted by the rock-shaft G, so that the halved fruit is discharged from the chutes into the compartments of the table, and in this position lie upon their backs, as shown in dotted lines. By the movement of the table under the scraper J the halved fruit is scraped off the table and discharged upon the apron I, lying face down on said apron, as shown in dotted lines, and thence said fruit is carried down the apron and discharged over its end into a passing underlying tray, and in this discharge the halves of fruit are turned over again upon their backs and are moved forward periodically by the tray, the movement of the tray being timed to present a fresh surface for each load of fruit delivered by the apron.

The machine is adapted for handling any kind of fruit to be pitted, and for each kind of fruit we would of course change the knives and their relative position to accommodate the different sizes.

Having thus described our invention, what we claim as new, and desire to secure by Letters Patent, is—

1. In a fruit-pitting machine, the combination of the traveling carrier provided with cross-slats formed with a series of grooves or slots to enable the slats to pass the knives, suitable holding devices comprising prong upon each side of the slots for the fruit upon said slats, and a series of fixed knives having forked forward ends, against which the fruit is carried by the slats, whereby it is divided and the pit removed, substantially as herein described.

2. In a fruit-pitting machine, the combination of the traveling carrier, the slats thereon, the flexible or springy separated strips rising from said slats to hold and cushion the fruit and allow the detention of the pit, the holding-prongs, and the series of fixed knives against which the fruit is carried, whereby it is divided and the pit removed, substantially as herein described.

3. In a fruit-pitting machine, the combination of the traveling carrier having the cross-slats, the prongs thereon, the flanges upon said slats, the flexible or springy separated strips secured to the flanges and serving to hold and cushion the fruit upon the slats and allow the detention of the pit, and the series of fixed knives against which the fruit is carried by the moving slats, whereby it is divided and the pit removed, substantially as herein described.

4. In a fruit-pitting machine, the combination of the traveling carrier with its cross-slats, the prongs on said slats to hold the fruit, the separated bearing-flanges of said slats, and the fixed knives against which the fruit is carried, whereby the fruit is divided and the pit removed, substantially as herein described.

5. In a fruit-pitting machine, the combination of the traveling carrier having the cross-slats, the flanges upon said slats, the flexible or springy separated strips secured thereto, the prongs rising from the slats to receive and impale the fruit, and the series of fixed knives against which the fruit is carried, whereby it is divided and the pit removed, substantially as herein described.

6. In a fruit-pitting machine, the combination of the traveling carrier having the cross-slats, the flexible strips and the prongs on said slats for holding the fruit, the series of fixed knives having the curved-out faces, and the curved cross-points at the bases of said faces for retaining the pit as the knives divide the fruit, substantially as herein described.

7. In a fruit-pitting machine, the combination of the traveling carrier, the flexible strips and prongs thereon for holding the fruit, and the series of fixed knives against which the fruit is carried, whereby it is divided, said knives being in vertical planes and having U-shaped or forked fronts to receive and cut the fruit and curved cross-points for the pit, substantially as herein described.

8. In a fruit-pitting-machine, the combination of the endless traveling carrier having suitable devices for holding the fruit, the series of fixed knives against which the fruit is carried, whereby it is divided and its pit removed, and a series of receiving flanged chutes located behind and in line with the knives and overlapping the endless carrier at its bight, whereby the cut fruit is delivered into the chutes as the carrier bends down on its return, substantially as herein described.

9. In a fruit-pitting machine, the combination of the traveling carrier having suitable holding devices for the fruit, the series of fixed knives against which the fruit is carried, whereby it is divided and the pit removed, and the series of chutes H at the end of the carrier having side flanges and central partitions in the line of the knives, whereby the chutes are divided into two compartments, one on each side of each knife, to receive the cut fruit as it passes back of the knives, substantially as herein described.

10. In a fruit-pitting machine, the combination of the traveling carrier having the cross-slats provided with holding-prongs on which the fruit is impaled, the series of fixed knives against which the fruit is carried, whereby it is divided and the pits removed, and the series of compartment-chutes at the back of each knife at the end of the carrier, said chutes having in their forward ends slits for the passage of the holding-prongs of the slats, whereby the fruit is delivered into the compartments of the chutes, substantially as herein described.

11. In a fruit-pitting machine, the combination of the traveling carrier having cross-slats with prongs for holding the fruit, the series of fixed knives against which the fruit is carried, whereby it is divided and its pit removed, and the series of compartment-chutes behind the knives and overlapping the bight of the carrier, said chutes having slits at the forward end to enable them to move up close to and overlap the knives and permit the passage of the prongs of the carrier-slats, substantially as herein described.

12. In a fruit-pitting machine, the combination of the traveling carrier having suitable holding devices for the fruit, the series of fixed knives against which the fruit is carried, whereby it is divided and the pits removed, and the tilting chutes back of the knives at the end of the carrier, whereby they receive the cut fruit from the carrier and discharge it by their tilting, substantially as herein described.

13. In a fruit pitting and spreading machine, the combination of the traveling carrier having suitable devices for holding the fruit, the series of fixed knives against which the fruit is carried, whereby it is divided and the pits removed, the table back of the knives, and the tilting receiving-chutes carried by the frame of the table at the end of the carrier, whereby the cut fruit is received in the chutes and discharged upon the table, substantially as herein described.

14. In a fruit pitting and spreading machine, the traveling carrier having suitable devices for holding the fruit, and the series of fixed knives against which the fruit is carried, whereby it is divided and the pits removed, in combination with the table, the rock-shaft G in the frame of said table, and the receiving-chutes H, carried by the rock-shaft at the end of the carrier, whereby the fruit is received from the carrier and discharged by the tilting of the chutes upon the platform, substantially as herein described.

15. In a fruit pitting and spreading machine, the traveling carrier having devices for holding fruit, and the series of fixed knives against which the fruit is carried, whereby it is divided and the pits removed, in combination with the table F, having the partitions $f$, dividing it into compartments, the rock-shaft G, carried by the frame of the table, and the compartment-chutes H, carried by the rock-shaft and adapted to receive the cut fruit from the carrier and to discharge it into the compartments of the table, substantially as herein described.

16. In a fruit pitting and spreading machine, the combination of the reciprocating table for receiving the cut fruit and having compartments therefor, the fixed scraper adapted to pass through said compartments, whereby the fruit is scraped off, and the underlying apron for receiving the fruit, substantially as herein described.

17. In a fruit pitting and spreading machine, the combination of the reciprocating table having the partitions $f$, dividing it into compartments, in which the cut fruit is received, the slotted stationary scraper under which the table passes, its partitions passing through the slots thereof, and the underlying traveling apron for receiving the fruit scraped off the table, substantially as herein described.

18. In a fruit pitting and spreading machine, the combination of the reciprocating table for receiving the cut fruit, the fixed scraper under which the table passes, whereby the fruit is scraped off, the underlying traveling apron for receiving the fruit, the traveling carrier K below, and the trays on said carrier into which the fruit is delivered by the apron, substantially as herein described.

19. In a fruit pitting and spreading machine, the combination of the traveling carrier having holding devices for the fruit, the series of fixed knives against which the fruit is carried, whereby it is divided and the pits removed, the reciprocating compartment-table, the rock-shaft carried thereby, and the tilting compartment-chutes carried by the rock-shaft at the end of the carrier, whereby they receive the cut fruit and by their tilting deliver it upon the table, the scraper for removing the fruit from the table, the underlying traveling apron for receiving the fruit, the endless carrier K below, and the trays on the carrier for receiving the fruit from the apron, substantially as herein described.

20. In a fruit pitting and spreading machine, an endless carrier for the fruit, a series of knives against which the fruit is carried, whereby it is cut and the pits removed, and the reciprocating table having tilting receiving-chutes at the end of the carrier, whereby they receive the cut fruit and deliver it to the table, in combination with a mechanism for reciprocating the table, consisting of the crank-wheels O, suitable power-gearing for driving them, and the pitmen $o'$, connected with the crank-wheels and with the table, substantially as herein described.

21. In a fruit pitting and spreading machine, the traveling carrier for the fruit, the series of fixed knives against which the fruit is carried, whereby it is cut and the pits removed, the reciprocating table, the rock-shaft G in the frame thereof, and the receiving-chutes carried by the rock-shaft, in combination with the means for rocking said shaft to tilt the chutes, whereby they discharge the cut fruit onto the table, consisting of the weighted crank-arm $g$, secured to the rock-shaft, and a fixed pin or stud in the frame of the machine against which the crank-arm comes in contact by the movement of the table, substantially as herein described.

In witness whereof we have hereunto set our hands.

GEO. A. FLEMING.
CHARLES F. FLEMING.
GEO. T. McLAUGHLIN.

Witnesses to G. A. Fleming and G. T. McLaughlin:
SALUVA DARLING,
WARREN E. HYDE.

Witnesses to C. F. Fleming:
ANNA BIXBY,
EDWD. LIEBERKNECHR.